(12) United States Patent
Ditter et al.

(10) Patent No.: US 6,687,649 B2
(45) Date of Patent: Feb. 3, 2004

(54) SYSTEM, METHOD AND COMPUTER PROGRAM FOR A SYNOPTIC INTERLOCK PROMPTING AND INPUT OVERRIDE SYSTEM WITH A MAINTENANCE LOG

(75) Inventors: John Ditter, Brookfield, WI (US); Scott Walczak, Oconomowoc, WI (US)

(73) Assignee: Schneider Automation Inc., North Andover, MA (US)

( * ) Notice: Subject to any disclaimer, the term of this patent is extended or adjusted under 35 U.S.C. 154(b) by 62 days.

(21) Appl. No.: 09/845,142

(22) Filed: Apr. 30, 2001

(65) Prior Publication Data

US 2002/0161554 A1 Oct. 31, 2002

(51) Int. Cl.[7] .................................................. G06F 11/30
(52) U.S. Cl. ........................ 702/182; 702/119; 702/123; 702/182; 702/185; 700/17; 700/19; 700/52; 700/83; 340/3.1; 340/3.44; 340/3.71; 340/3.9
(58) Field of Search ............................. 702/33, 113–115, 702/119, 122–123, 182, 185, 188, FOR 103, 104, 123.124, 134, 136, 155, 170, 171; 700/9, 17, 19, 46, 52, 54, 83, 150, 169, 247, 250; 340/2.24, 3.1, 3.42, 3.44, 3.71, 3.9, 7.1, 691.8, 853.1, 909, FOR 206

(56) References Cited

U.S. PATENT DOCUMENTS 5,794,164 A * 8/1998 Beckert et al. ................. 701/1
6,269,300 B1 * 7/2001 Moore-McKee et al. ... 701/102

* cited by examiner

*Primary Examiner*—Marc S. Huff
*Assistant Examiner*—Elias Desta
(74) *Attorney, Agent, or Firm*—Michael J. Femal; Larry I. Golden

(57) ABSTRACT

A system, method and computer program for facilitating the operation of a control system utilizing one or more input devices is disclosed. The control system provides the ability to monitor and modify operating parameters of the input devices. A function integrated within a software code is to be executed by the control system. The function is responsive to the input device. The input device includes at least one condition comprising a state wherein all of the conditions must be met prior to the execution of the function. A display of an unmet condition is exhibited to operator personnel of the control system during the execution of any function having an unmet condition prohibiting the execution of the function. The operator personnel is capable of overriding the unmet condition by selecting the state of the condition that allows the condition to be met, thus allowing the function to be executed. A maintenance log contains a record of the conditions that were bypassed or overridden. The maintenance log can be utilized for repair and replacement of faulty devices during scheduled maintenance periods.

20 Claims, 3 Drawing Sheets

| Input Device | Condition | Date | Amount of Overrides | Operator # | Miscellaneous |
|---|---|---|---|---|---|
| | | | | | |
| | | | | | |
| | | | | | |
| | | | | | |
| | | | | | |

*Fig. 3*

SYSTEM, METHOD AND COMPUTER PROGRAM FOR A SYNOPTIC INTERLOCK PROMPTING AND INPUT OVERRIDE SYSTEM WITH A MAINTENANCE LOG

DESCRIPTION

1. Technical Field

The present invention relates to diagnosing, troubleshooting, correcting and reporting machine control problems. More particularly, the present invention relates to a system and method for overriding interlocking conditions and providing a maintenance log of such interventions.

2. Background of the Invention

In many machine control systems that utilize a computer or electronic controller, performing a machine function requires satisfaction of certain conditions or interlocks. For example, in order to execute Function A, a certain condition, Condition 1, of the machine must exist or be present. If Condition 1 does not exist, the controller will not allow the machine to execute Function A. In this situation, operator personnel attempting to execute Function A on the machine must diagnose, troubleshoot and correct the machine status to meet Condition 1 before Function A will be executed.

It is possible to have a condition or conditions actually being present, however, the condition may be diagnosed by the machine as not being present or not being satisfied. For example, an input device such as a switch or sensor may have failed to work properly. In such an instance, the condition actually exists, but because the device is not working properly, the condition appears to the machine as not to have been met. Thus, the machine will not execute the related function. Operator personnel must then load another software program on the operator interface computer to ignore or override the unmet condition of the input device.

Existing systems do not allow concurrent, direct, overriding of faulty input device conditions required to implement a machine function. Existing systems require that an operator load another software program on the operator interface computer to override an unmet input condition, or use a separate computer to override inputs with unmet conditions.

The present invention is provided to solve these and other problems.

SUMMARY OF THE INVENTION

One embodiment of the present invention is directed to a method of facilitating the operation of a control system comprising one or more operably connected input devices by providing the ability to monitor and directly modify operating parameters of the one or more devices. A software code within the control system includes a function to be executed by the control system. The function is responsive to a device and the device has a condition wherein the condition must be met prior to execution of the function. An unmet condition is identified and displayed. The displayed unmet condition is overridden by designating the condition as being satisfied. The satisfied condition thus allowing the function to be executed.

Another embodiment of the present invention discussed above includes a database log for compiling the input device(s) that was overridden by the machine operator personnel. A maintenance report identifying the one or more devices associated with any unmet condition that was overridden can be generated from the database log.

Yet another embodiment of the present invention includes prompting a user to override an unmet condition. Alternatively, the unmet condition can be automatically overridden after a predetermined amount of overrides of the unmet condition has been executed by the system. A predetermined limit of overrides for the unmet condition is provided to the system. The number of unmet conditions summarized in the log database is compared to the predetermined limit. If the predetermined limit is exceeded, the prompt provided to the user to override the unmet condition is discontinued and the override of the unmet condition will be automatic from thereon.

An object of the present invention is to provide a system and/or process for machine operator personnel to directly override faulty input devices in a control system during execution of a machine function. And to further provide a log listing the overridden conditions and describing suggested maintenance of the control system.

Another object of the present invention is to provide a way of diagnosing, troubleshooting and correcting in an industrial control system utilizing an input device, an electronic controller or computer for logic control, and/or a computer for an operator interface. To this end, a further object of the present invention is to provide a method of reporting maintenance requirements for repairs to be completed during scheduled downtime of the machine.

DETAILED DESCRIPTION

Figure 1:
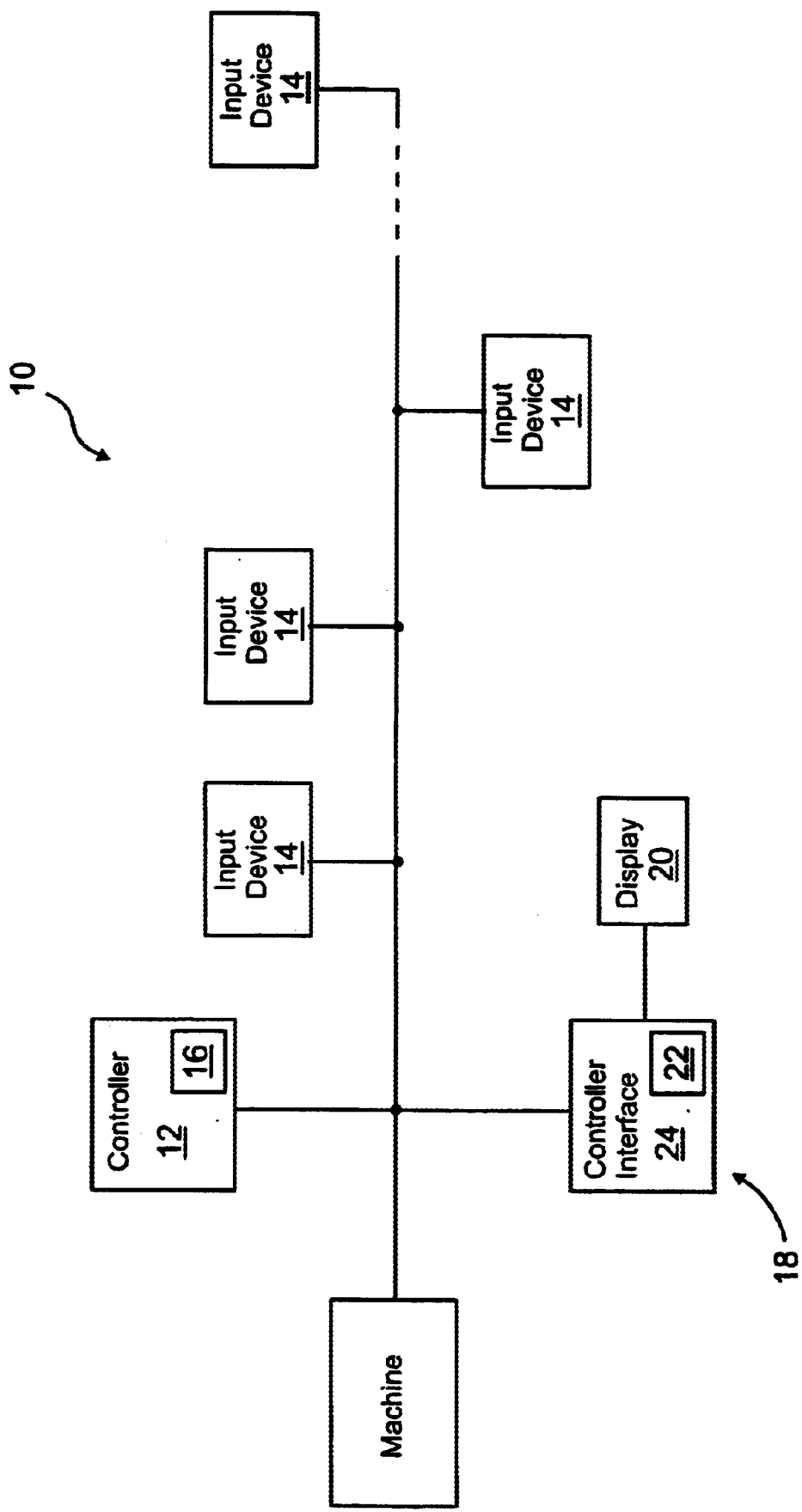
FIG. 1 is a block diagram of the preferred embodiment of the present invention.
Figure 2:
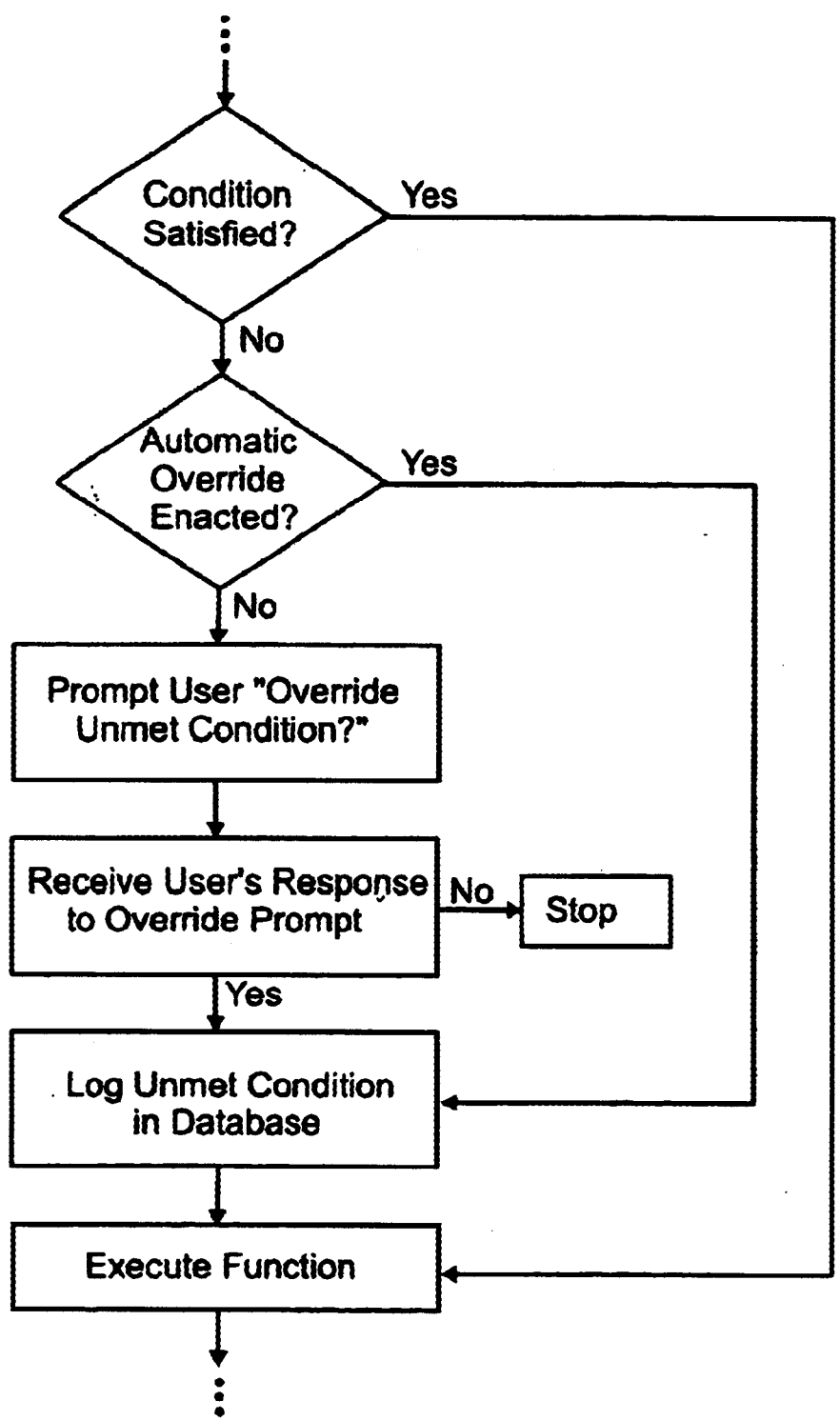
FIG. 2 is a flow chart of the preferred embodiment of the present invention; and, FIG. 3 is one embodiment of a log of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is integrated within an industrial machine control system 10 that utilizes computers or electronic controllers 12 for manufacturing and production. The system preferably comprises an electronic controller, programmable logic controller, or computer 12; logic software 16 in the electronic controller; an operably connected input device 14, i.e., switch, gauge, sensor; an operator interface 18 with a terminal or display 20 to allow operator personnel to monitor and/or modify the operating parameters of the device; and, an operator interface software 22 on the operator interface computer 24. Execution of a machine function is dependent upon the operably connected input device 14. The device 14 comprises one or more conditions wherein each condition must be satisfied for the machine function to be executed.

The present invention is directed to improving the ability of machine operator personnel to diagnose, troubleshoot and correct machine control problems. A method is provided for operator personnel to directly override faulty or suspect input devices 14 operably connected within a machine control system 10. The faulty device 14, having an interrupting effect on the execution of the function, can be bypassed or ignored during execution of its related, operably responsive machine function. Furthermore, a log 26 can be generated identifying faulty input devices 14 that may require maintenance. FIG. 3.

Referring to FIG. 1, a machine control system 10 utilizes a computer or electronic controller 12 operably connected to one or more input devices 14. Also connected to the system 10 is a means for displaying 18 interaction between the control system and the operator personnel. The execution of a machine function requires certain input device conditions to be satisfied. For example, in order to execute a function, Function A, a certain condition, Condition 1, of the machine or input device must exist or be present. If Condition 1 does not exist, the controller will not allow the machine to execute Function A. In this situation, operator personnel of the control system attempting to execute Function A on the input device must diagnose, troubleshoot and correct the state of Condition 1 before continuing.

It is possible that the control system 10 will indicate that a condition does not exist, yet in reality, the condition does in fact exist. For example, an input device 14 such as a switch or sensor may have failed. As such, operator personnel may determine that Condition 1 does indeed exist, but the computer or electronic controller 12 is not aware that Condition 1 exists because of the failure of the input device 14, i.e., switch, sensor, gauge, etc. Utilization of a synoptic interlock prompting and input override system facilitates diagnosing, troubleshooting and correcting such a problem encountered in the control system.

In this case, the operator may override or bypass the inaccurate input device 14 that determines the presence of Condition 1. The input device 14 is displayed on the synoptic interlock prompting display screen 20 for the unexecuted function. Operator personnel can select the input device 14 that determines Condition 1 and override the erroneous state with a state that will satisfy the condition. The machine can then proceed with the execution of Function A.

As an example, machine operator personnel attempt to execute a function, Function A, on the machine. Function A cannot be executed because a condition of the machine, Condition 1, does not exist. If the operator attempts to execute Function A, a message is displayed on the operator interface indicating the reason that Function A cannot be executed, namely, the absence of Condition 1. The operator can bypass this condition by designating that Condition 1 is met or altering the state of the condition of the input device so that Condition 1 will exist. The condition of the input device 14 operably connected to the system 10, i.e., switch, sensor, gauge, etc.; may be bypassed and overridden via the screen 20 that is displayed when the execution of the function is attempted. It is to be understood that a function may require several conditions to be satisfied before it can be executed.

The synoptic interlock prompting display 18 prompts the operator personnel by concurrently providing a screen depicting the suspended Function A. The screen 20 displays each unmet condition and prompts the operator to override the unmet condition. This allows the operator to quickly determine which conditions are satisfied and not satisfied. Alternatively, the screen 20 can display the current status of all conditions required to execute Function A.

It is to be understood that the synoptic interlock prompting display screen 20 similar to the one described above for Function A, exists for each machine function dependent upon an input device condition, i.e., B, C, D, etc. The functions performed on a machine are shown concurrently displayed on the operator interface computer 18 when the function is attempted. An unmet condition that stalls the execution of the machine function is similarly displayed to the operator. The actual state of each unmet condition required for the execution of a machine function is monitored and displayed on the operator interface computer 18 when the function is attempted.

When an override is implemented in the described manner, it can be recorded in a database log 16 with information including the time, date, and the specific input condition that was overridden. Over time, the database log 26 compiles a list of devices 14 and corresponding conditions that have required intervention by operator personnel wherein unmet conditions have been disregarded to maintain machine operation during production. This data can be used to generate a maintenance report that identifies, defines and suggests repairs that are most likely required during the scheduled downtime of the machine.

In addition, the present invention includes an automatic override that can be implemented once a predetermined amount of overridden unmet conditions for a specific input device has been exceeded. The automatic override is beneficial for those cases involving a known faulty, or inoperable input device 14 that is not able to be readily replaced or repaired. The faulty device 14 will continue providing inaccurate conditions that will impede execution of the function. Utilization of the automatic override in such a case will discontinue prompting the operator to override this specific condition (and device) once a specified number of overrides has been performed or exceeded. Preferably, a predetermined limit of overrides is selected by the user and compared against the number of overrides performed and logged into the database. If the override of a specific condition has been performed equal to or greater than the predetermined limit, the prompt to the user will be discontinued and the override for further conditions related to that specific input device 14 will be automatic from thereon. Once the inoperable input device 14 has been repaired or replaced, the prompt to override can be reinstated.

The described features of the present invention combine to provide a cohesive system of diagnosing, troubleshooting and correcting machine control problems by interacting with the operator to override conditions impeding the execution of a machine function.

While the specific embodiments have been illustrated and described, numerous modifications come to mind without significantly departing from the spirit of the invention and the scope of protection is only limited by the scope of the accompanying Claims.

We claim:

1. A method of facilitating operation of a control system utilizing one or more operably connected devices by providing the ability to monitor and directly modify operating parameters of the one or more devices, the method comprising the steps of:

providing a software code having a function to be executed by the control system, the function being responsive to a device, the device having a condition wherein the condition must be met prior to execution of the function;

identifying an unmet condition, the unmet condition prohibiting the function from being executed;

prompting a user to override the unmet condition by displaying the unmet condition to the user;

receiving a response from the user to override the unmet condition; and, overriding the unmet condition by designating the condition as being satisfied, the satisfied condition allowing the function to be executed.

2. The method of claim 1 further comprising recording the overridden unmet condition in a database log.

3. The method of claim 2 further comprising generating a maintenance report identifying the overridden unmet condition and the related device.

4. The method of claim 1 wherein the response to override the unmet condition is automatic after a predetermined amount of overrides of the condition has been encountered.

5. The method of claim 2 further comprising:

providing a predetermined limit of overrides for the condition, the limit representing the amount of overrides to be encountered before an automatic override is implemented by the control system;

comparing an amount of overridden unmet conditions logged in the database to the predetermined limit of overrides;

discontinuing to prompt the user to override the unmet condition and automatically overriding the unmet condition if the amount of overridden unmet conditions logged in the database exceeds the predetermined limit.

6. A method of facilitating the operation of a control system utilizing one or more operably connected devices by monitoring and modifying operating parameters of the one or more devices, the method comprising the steps of:

providing a software code having a function to be executed by the control system, the function being responsive to the one or more devices, each of the one or more devices having a condition comprising a state wherein the condition must be met prior to execution of the function;

concurrently displaying during the execution of the function a synoptic interlock prompting display associated with the function for displaying the one or more devices having an unmet condition and the respective state of each unmet condition, the unmet condition impeding the function from being executed;

prompting to override all of the unmet conditions;

receiving a response to override all of the unmet conditions; and, overriding all of the unmet conditions by designating each condition as being satisfied, the satisfied condition allowing the function to be executed.

7. The method of claim 6 wherein the designating each condition as being satisfied comprises providing the software code with the state of the unmet condition to allow the unmet condition to be met.

8. The method of claim 6 further comprising recording the overridden unmet condition in a database log.

9. The method of claim 6 further comprising generating a maintenance report identifying the overridden unmet condition and related device.

10. The method of claim 6 wherein the response to override the unmet condition is automatic after a predetermined amount of overrides of the unmet condition has been performed.

11. The method of claim 10 further comprising:

providing a predetermined limit of overrides for the condition, the limit representing the amount of overrides to be encountered before an automatic override is implemented by the control system;

comparing an amount of overridden unmet conditions logged in the database to the predetermined limit of overrides;

discontinuing to prompt the user to override the unmet condition and automatically overriding the unmet condition if the amount of overridden unmet conditions logged in the database exceeds the predetermined limit.

12. A control system for executing a function, the control system having an operably connected input device and an override mechanism for facilitating the operation of the control system, the control system comprising:

a function embedded in a software code, the function being responsive to the input device wherein the device has a condition comprising a state, the condition of the input device must be satisfied prior to the function being executed;

a synoptic interlock prompting display for displaying an unmet condition, the unmet condition impeding the execution of the function;

a prompt provided to a user to override the unmet condition; and, an override responsive to a response to the prompt wherein the unmet condition is designated in the software code as being satisfied, thus allowing the function to execute.

13. The control system of claim 11 further comprising:

a database log for compiling an amount of the overridden unmet condition.

14. The control system of claim 11 further comprising a maintenance report identifying the device associated with the overridden unmet condition.

15. The control system of claim 12 further comprising:

an automatic override for discontinuing the prompt transmitted to the user to override the unmet condition when a predetermined amount of overrides have been performed.

16. The control system of claim 15 wherein the automatic override comprises:

a predetermined limit of overrides for the condition, the limit representing an amount of overrides to be approved by the user before the automatic override is implemented by the control system; and, a comparator for comparing the amount of overridden unmet conditions logged in the database to the predetermined limit of overrides, the automatic override being operably responsive to the comparator.

17. A medium readable by a computer, the medium providing a set of instructions for managing operating parameters of network devices, the medium comprising:

a first instruction for identifying an unmet condition of a network device, the unmet condition inhibiting a function operably responsive to the network device;

a second instruction for displaying the unmet condition; and, a third instruction for designating the unmet condition as being met.

18. The medium of claim 17 further comprising:

a fourth instruction for recording the designated met condition in a database log.

19. The medium of claim 18 further comprising:

a fifth instruction for generating a maintenance report identifying the designated met condition with the network device.

20. The medium of claim 19 further comprising:

a sixth instruction for counting an amount of occurrences the unmet condition has be designated as being met; and, a seventh instruction for automatically designating the unmet condition as being met after the amount of occurrences has exceeded a predetermined limit.

* * * * *